July 2, 1963
T. HUTCHINSON
3,096,400
APPARATUS FOR MEASURING THE MARK-SPACE
RATIO OF A TRAIN OF PULSES
Filed April 4, 1961
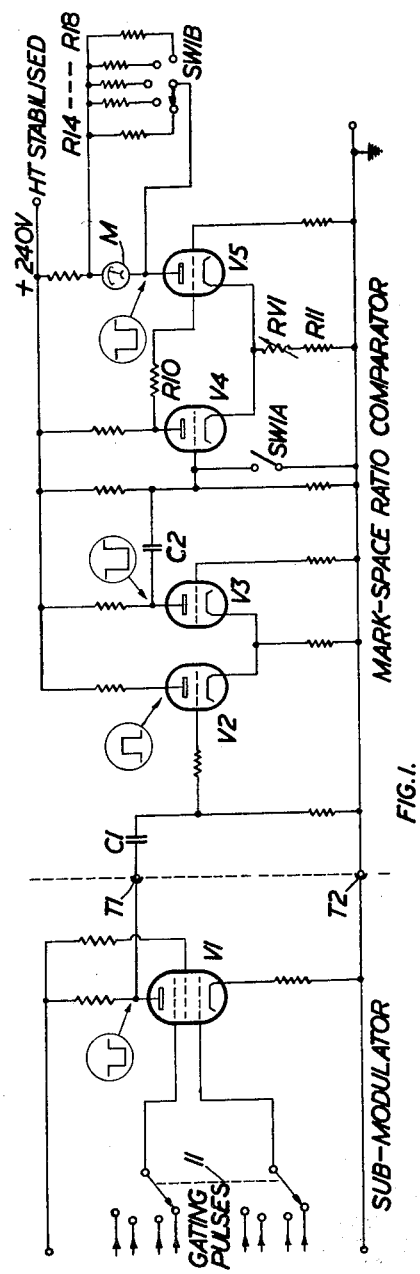
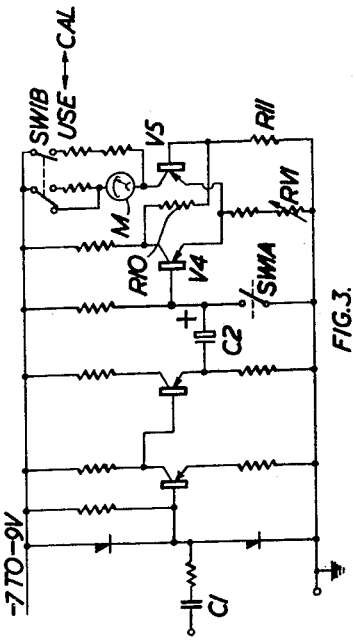
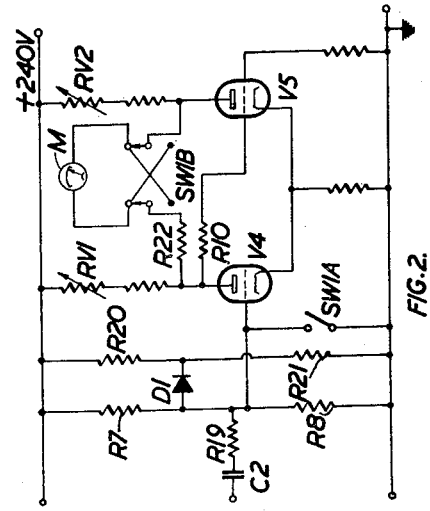
Inventor
Terence Hutchinson
By Cushman, Darby & Cushman
Attorneys ތ
United States Patent Office 3,096,400
Patented July 2, 1963

3,096,400
APPARATUS FOR MEASURING THE MARK-SPACE RATIO OF A TRAIN OF PULSES
Terence Hutchinson, Belfast, Northern Ireland, assignor to Short Brothers & Harland Limited, Belfast, Northern Ireland, a British company
Filed Apr. 4, 1961, Ser. No. 100,601
Claims priority, application Great Britain Apr. 11, 1960
8 Claims. (Cl. 178—69)

The present invention relates to apparatus for measuring the mark-space ratio of a train of pulses and is particularly though not exclusively concerned with the measurement of the mark-space ratios of electrical pulses employed in radio signalling.

Mark-space signalling is widely employed in radio communication, the mark-space signals being transmitted as modulations of a high frequency oscillation. In many instances and particularly in radio test equipment transmitting such signals, the mark-space ratio must be accurately set at a predetermined value and from time to time checked, and it is accordingly the principal object of the present invention to provide improved apparatus for such measurements.

According to the present invention there is provided apparatus for measuring the mark-space ratio of a train of pulses, comprising a current measuring device adapted to measure the average current traversing a path in a switching circuit which can be switched by said pulses between two conditions, in one of which the magnitude of the current in said path is of a first predetermined value and in the other of which the magnitude of the current in said path is of a second predetermined value.

It can readily be shown that the average current of a train of current pulses of mark-space ratio N is proportional to $$\frac{N}{N+1}$$

Thus a measure of the average current provides a measure of $$\frac{N}{N+1}$$

and a current measuring device which measures average current can by suitable choice of scale be adapted to read the mark-space ratio N directly.

Some embodiments of the invention will now be described by way of example with reference to the accompanying drawings in which:

FIG. 1 is a circuit diagram of a mark-space ratio comparator according to one embodiment of the invention shown connected to the output stage of a sub-modulator, FIG. 2 is a circuit diagram corresponding to a part of the circuit shown in FIG. 1, and modified according to a second embodiment of the invention, and FIG. 3 is a circuit diagram of a mark-space ratio comparator according to a third embodiment of the invention employing transistors.

The mark-space ratio comparator shown in FIG. 1 is adapted for use in calibrating the outputs of test equipment submodulators generating high frequency oscillations modulated by mark-space signals.

In carrying out a test on a sub-modulator the appropriate gating pulses determining the mark-space ratio of the output of any one of four output gating valves are extracted by means of a switch 11 from which they are fed to a gating valve V1 similar to those functionally used in the sub-modulator. Thus, no interference from high frequency tones or other pulse waveforms present in the sub-modulator is encountered. The gating valve V1 is normally situated in the sub-modulator and under test is connected to input terminals T1 and T2 of the mark-space ratio comparator. The sub-modulator can thus readily be connected to the comparator.

The mark-space gating pulses fed to the valve V1 of the sub-modulator appear at the anode of this valve in the form of a pulse train of constant mark-space ratio, the negative-going portions in the train corresponding to "mark" signals and the positive-going portions to "space" signals. From the anode of the valve V1, the pulse train is fed to the control grid of a valve V2, which is one of a pair of valves V2, V3 operating together as an amplifier. The output of the amplifier is a pulse train of the same sense and mark-space ratio as the input pulse train applied thereto and is fed to the control grid of a valve V4, which together with a further triode valve V5 constitutes a switching circuit which responds to the pulses applied to the control electrode of the valve V4. The valves V4 and V5 have a common cathode load formed by resistors RV1 and R11 and the control electrode of the valve V5 is connected to the anode of the valve V4 through a resistor R10. The anode circuit of the valve V5 includes an ammeter M which can be shunted by any one of a plurality of shunting resistors R14–R18 by appropriate setting of a switch SW1B.

In operation, with a negative-going pulse on the control grid of the valve V4, the valve V4 is held cut off and the valve V5 rendered conducting. This condition corresponds to a "mark" interval and in this condition current flows through the ammeter M. With a positive-going pulse on the control grid of the valve V4, this valve is rendered conducting and the valve V5 is cut off. This condition corresponds to a "space" interval, during which no current flows through the ammeter M.

In the present embodiment shown in FIG. 1, shunt resistors R14 to R18 are provided and one is selected, by means of a switch SW1B, which is of such a value that a constant peak current is supplied to the ammeter M for the particular pulse train under test. For calibration of the ammeter M, a switch SW1A is closed causing the valve V4 to become cut off and the valve V5 to conduct. The total current in the valve V5 is then adjusted by varying the resistor RV1 so as to give a definite level of current at the anode of the valve V5. When the valve V5 is switched on and off rapidly, up to a few hundred times per second, at a constant on/off ratio, the current at the anode will be proportional to the "on" time divided by the repetitive interval between leading edges of the pulses in the pulse train. This particular example of this method of indication is most suited to pulse trains having only a few conditions of particular mark-space ratios.

In the embodiment shown in FIG. 1, the meter M is arranged to take a particular fraction of the available current in order to ensure independence from meter non-linearity. The relationship between meter resistance ($R_m$) and shunt resistance ($R_s$) is thus related to the mark-space ratio under measurement.

For example, for a mark-space ratio 1 to 3 off, i.e. $N=\frac{1}{3}$, the average current for, say, a peak current of 5000 $\mu$A will be 1250 $\mu$A, and the shunt resistor will, for example, be such that 1200 $\mu$A flows through the shunt. Thus, $$\frac{R_s}{R_m} = \frac{50}{1200}$$

where $R_m$ is known very accurately.

In the general case $$\frac{R_s}{R_m} = \frac{I_1}{I_2 - I_1}$$

where $$I_2 = I_{max} \cdot \left(\frac{N}{N+1}\right)$$

and $I_1$ = a constant current.

In the above example $$\frac{R_s}{R_m} = \frac{50}{1200}$$

since $I_1$ has been chosen to be 50 μA.

In this system of measurement the shunt resistance is different for each mark-space ratio, and hence the anode resistance of the valve V5 is not constant. However, it may be readily arranged that the maximum change in anode resistance does not exceed 10% of the total anode load. The present circuit is so designed that the peak anode current remains constant within ±0.2% for such a change in anode load.

If the meter resistance is not accurately stable with temperature a thermistor compensating network may be included in series with the meter M such that the combination of the meter resistance and thermistor network resistance is substituted for the resistance of the meter.

Some other embodiments of this invention will now be described. In these embodiments the method of indication is such that the meter indicates instantly the value of the mark-space ratio. The accuracy of this method depends on the quality of the meter, but a meter having a scale linearity of better than 1% is usually satisfactory.

Referring now to FIG. 2, this shows part of a circuit according to a second embodiment of the invention, the remainder of the circuit preceding the input to the capacitor C2 being identical to that preceding the capacitor C2 in FIG. 1.

The pulse train, as before, switches the valves V4 and V5 on alternately, the valve V5 taking current during a "mark" pulse, as defined previously, and the valve V4 taking current during a "space" pulse. Hence, when a ratio of unity is supplied to the grid of the valve V4, zero indication is required on the meter M. An end-zero scale or centre-zero scale is used on the meter M depending on the variation in mark-space ratios encountered in any application.

For calibration of the circuit shown in FIG. 2, it is only necessary to establish a condition where the anode current of the valve V4, when the valve V4 is switched on, is equal to the anode current of the valve V5 when the latter is switched on. Such calibration will now be described.

For an "end-zero scale" meter, with no pulse train input, switch SW1A is opened and resistor RV1 is adjusted until the meter reads full scale deflection. Switch SW1A is then closed and the terminals of the meter are reversed by means of switch SW1B. Resistor RV2 is then adjusted until the meter reads full scale deflection.

It is necessary to make the switching circuit independent of amplitude variations and this is achieved, for example, by a D.C. restoring network consisting of the resistors R7, R8, R20, R21 and a high peak inverse voltage rated diode D1. The diode D1 is maintained in a partially conducting state so that any attempted positive excursion of the incoming waveform at the anode of the diode is prevented by the diode conducting readily and causing clipping of the waveform. The resistor R19 prevents undue loading of the previous stages of amplification in the process of clipping. Thus, the grid of the valve V4 can only be held at a predetermined voltage level or at voltages negative with respect to this level, so that the peak current in the valve V4 is independent of variations of amplitude at the input to C2.

For pulse train ratios other than unity the difference in the average currents of the valves V4 and V5 gives a direct measure of the mark-space ratio.

In the case where a ratio extends over the range from $$\frac{1}{x} \text{ to } \frac{x}{1}$$

where $x$ is large, for example 20, then a centre zero meter may be used and the meter reversing during calibration dispensed with. It is to be understood that the meter needle is set mechanically to zero on recalibration.

The method of measurement last described depends on meter linearity but is independent of meter resistance to a great extent since the resistor R22 will be chosen to be very large, for example 470K ohms.

High stability components should of course be used.

The effects of changes in anode resistance referred to in the first-described embodiment do not require to be considered in this case.

In yet another embodiment of the invention the meter is situated in the anode circuit of the valve V5 in series with the anode, and simply gives the average current at that point. An equivalent circuit employing transistors is shown in FIG. 3. To obtain maximum scale deflection corresponding to unity mark-space ratio, a system of calibration is employed utilizing resistors in such a way that the total resistance in the circuit of the final switching stage is the same for the calibration condition as for the normal functioning condition. This is due to the necessity, in the application for which it was designed, not to consider mark-space ratios greater than unity. Thus the meter draws half of the total current by virtue of the fact that it and its series resistor shown in FIG. 3 are equal in conductance to the resistors in parallel therewith. Also, the resistance in the collector circuit of the final switching stage in the calibration condition is identical to that in the "use" condition. Again temperature compensation may if desired be employed. Generally the meter sensitivity in transistor applications of this kind need not be as great as that for the equivalent valve applications.

What I claim as my invention and desire to secure by Letters Patent is:

1. Apparatus for measuring the mark-space ratio of a train of pulses comprising a two condition switching circuit including a pair of electronic valves each having an anode circuit, a cathode and at least one control electrode, the cathodes of the valves being connected to a common cathode load with the valves being further connected together so that one of the valves is cut off in one of the two conditions of the switching circuit, means for applying said pulses to said switching circuit to cause said one of the valves to be switched, in the absence of a pulse, to a first condition in which the current flowing in the anode circuit of said one of the valves is of a first constant value, and in the presence of a pulse, to a second condition in which the current flowing in the anode circuit of the said one of the valves is of a different constant value, and a current measuring device connected in series in the said anode circuit of said one valve for measuring the average current flowing therein as an indication of the mark-space ratio of the applied pulses.

2. Apparatus for measuring the mark-space ratio of a train of pulses comprising a two condition switching circuit including a pair of electronic valves each having an anode circuit, a cathode and at least one control electrode, the cathodes of the valves being connected to a common cathode load with the valves being further connected together so that a different one of the valves is cut off in different ones of the two conditions of the switching circuit, a current measuring device connected in a current path between a point in the anode circuit of one of the valves and a corresponding point in the anode circuit of the other of the valves, and means for applying said pulses to said switching circuit to cause said valves to be switched, in the absence of a pulse, to a first condition in which the potential difference between said points is of a first constant value, and in the presence of a pulse, to a second condition in which the potential difference between said points is of a different constant value, to cause an indication from said current measuring device of the mark-space ratio of the applied pulses.

3. Apparatus for measuring the mark-space ratio of a train of pulses comprising a two condition switching circuit including a pair of transistors having respective collector circuits but a common emitter load and being connected together so that one of the transistors is cut off in one of the two conditions of the switching circuit, means for applying said pulses to said switching circuit to cause said one of the transistors to be switched, in the absence of a pulse, to a first condition in which current flowing in the collector circuit of the said one of the transistors is of a first constant value, and in the presence of a pulse, to a second condition in which the current flowing in the collector circuit of the said one of the transistors is of a different constant value, and a current measuring device connected in the said collector circuit of said one transistor for measuring the average current flowing therein as an indication of the mark-space ratio of the applied pulses.

4. Apparatus according to claim 1, comprising a plurality of shunt resistors for the current measuring device and means for selectively connecting them in parallel with the current measuring device.

5. Apparatus according to claim 4, wherein the said train of pulses is applied to the control electrode of the other of said valves, wherein a switch is provided which when operated applies a predetermined potential to the last-mentioned control electrode to cause the said one of the valves to conduct, and wherein the common cathode load includes a variable resistor for adjustment when the switch is operated to vary the current flowing in the anode circuit of the said one of the valves.

6. Apparatus according to claim 2, wherein the current measuring device comprises a meter having a scale provided with an end zero reading, wherein said meter is connected in said path through a reversing switch, and wherein said circuit, in addition, includes for the purpose of calibration a further switch for applying a predetermined potential to the switching circuit to switch the circuit from one condition to the other, and a variable resistor in each anode circuit for adjusting the current flowing therethrough and through the meter to produce full scale deflection thereof.

7. Apparatus according to claim 3, comprising a resistor connected in series with the current measuring device, a shunt resistor connected in parallel with the series resistor and current measuring device, and a switch which in one position maintains these connections and in another position short circuits the series resistor and disconnects the shunt resistor.

8. Apparatus according to claim 3, wherein the circuit includes a switch for applying a predetermined potential to the switching circuit corresponding to an input pulse of predetermined amplitude, and wherein the emitter load includes a variable resistor for adjusting the current flowing through the current measuring device.

References Cited in the file of this patent

UNITED STATES PATENTS

| | | |
|---|---|---|
| 2,147,729 | Wurmser | Feb. 21, 1939 |
| 2,513,525 | Shenk et al. | July 4, 1950 |
| 2,539,797 | Smith | Jan. 30, 1951 |
| 2,939,915 | Britt et al. | June 7, 1960 |